Patented Apr. 2, 1929.

1,707,671

UNITED STATES PATENT OFFICE.

ROBERT V. AYCOCK AND WILLIAM D. HARRIS, OF KANSAS CITY, MISSOURI, ASSIGNORS TO REFINOIL MANUFACTURING CORPORATION, OF KANSAS CITY, MISSOURI, A CORPORATION OF MISSOURI.

PROCESS OF REFINING USED OILS.

No Drawing.   Application filed July 27, 1928.   Serial No. 295,835.

This invention relates to a process for the refining of used mineral oils, but more specifically to used oils of internal combustion engines. The invention essentially comprises an addition to the process disclosed in copending application Serial No. 229,534, filed October 28, 1927, with slight modifications as will hereinafter more particularly appear. The object of our invention is to materially shorten the time required to produce a purified oil by the steps called for in the process outlined in application Serial No. 229,534, filed by Dr. Joseph C. Patrick, and this is accomplished by passing the oil, after the diluents have been removed, upwardly through fuller's earth: then allowing the products of the reaction to settle, forming a bed through which the oil is passed in the opposite direction.

A further object of the invention is to provide a relatively simple and efficacious process by which used mineral or lubricating oils may be refined and returned to their original color and non-malodorous condition through effecting the removal of all tarry asphaltic compounds, water, free carbon, metals, light hydrocarbons and other contaminations, the oil as refined possessing as good or better lubricating value and color than the original oil.

A further object is to produce a distinctly novel and efficient combination contact and filtering process to neutralize, decolorize and clarify the oil whereby the oil is passed and repassed through an active agent to insure complete and intimate contact. As far as we are aware no one has yet produced a completely efficient and relatively simple process or method of treatment whereby used oils are returned to their original translucent and refined condition.

In carrying out the process of the invention, the free water may first be separated by allowing the oil to stand quiescent, although if the amount of free water is so small that it will not materially dilute the sulphuric acid later employed in the process, this step may be entirely omitted.

After the removal of the free water, if such step is performed, but otherwise, the first step in the process, the oil is heated to approximately 120° F. and then it is acid treated by adding thereto preferably about two percent by volume of commercial sulphuric acid; the mixture of oil and acid being agitated from fifteen minutes to half an hour while being maintained at a temperature of approximately 120° Fahrenheit. The elevated temperature increases the fluidity of the oil, and insures a more intimate contact with the acid and thus materially accelerates the reaction. It will be understood of course that the temperature set out may be increased or decreased with a resulting quickening or slowing up in the time necessary for the acid treatment, but the temperature selected has been found by experiment to be the optimum for quick and efficient operation. The acid coagulates the free carbon, removes tarry coloring bodies, partially removes unsaturated hydrocarbons, and partially dehydrates the oil, forming all of the contaminations into a heavy sludge that settles to the bottom of the tank, the resulting coagulation settling to the bottom of the tank and in effect sweeping or carrying with it all solids which may be suspended in the oil.

The supernatant oil is now drawn off from the acid treating tank to a retort or still where it is heated in a relatively high vacuum to approximately 450° Fahrenheit, the exact temperature depending upon the viscosity that it is desired the ultimate product shall possess. We have found in practice that most desirable results are obtained with a vacuum of approximately 26 to 28 inches. The higher the temperature the more light ends are driven off and consequently the greater the viscosity of the final product. It will be evident however that the operator must not permit the temperature of the oil in the retort to reach such a degree as to lead to the cracking or breaking down of the lubricating components. Such heat treatment vaporizes and removes all diluents, unsaturated hydrocarbons and water.

After the oil has been treated as described, it is passed upwardly through a body of active material, such as fuller's earth, which will react with and retain colloidal metals, neutralize by adsorption any traces of acid present in the oil, and coagulate all other foreign bodies. As this reaction is sometimes more or less violent, the passage of oil upwardly through the fuller's earth is controlled to hold the reaction within reasonable limits. With this method of treatment complete and intimate contact is absolutely insured without mechanical agitation.

The fuller's earth or other active ingredient with the products of the reaction soon settle to the bottom of the contact tank, and it has been found that as a result of the method of contact described, the earth as changed by the reaction is so evenly distributed and broken up, that when it settles to the bottom it constitutes a porous filter bed without fissures or cracks as produced by other methods of contact, such fissures or cracks destroying the efficiency of the material as a filter.

The filter bed thus produced is so fine that the oil which has been passed upwardly may now be permitted to percolate downwardly through the material, or may be pulled through by an suitable suction apparatus if it is desired to speed up the process, and that such oil having first to pass in one direction and then in the other, will be found to be completely decolorized, neutralized and clarified.

Under some conditions it may be found desirable to pass the oil through an additional filtering medium in order to remove all possible traces of acid, colloidal metals or carbons. Such a filter bed may comprise a felt pad and fuller's earth or may be made in any other manner desired, provided it can entrap and neutralize the carbon and the acid respectively, which may pass through the first filter.

We claim:

1. The method of refining used mineral lubricating oil containing water and hydrocarbon diluents which consists in removing free water from the oil, heating the oil to approximately 120° F., adding sulphuric acid to the oil while hot, agitating the mixture, removing the oil from the resultant sludge, vaporizing diluents from the oil, contacting the oil with an active adsorptive reagent by passing the oil upwardly through such reagent whereby the reagent is temporarily suspended in the oil, allowing the reagent to settle into a cake and finally passing the oil in the reverse direction through said cake.

2. The method of refining used mineral lubricating oil containing water and hydrocarbon diluents which consists in removing free water from the oil, heating the oil, adding concentrated sulphuric acid to the oil while hot, removing the oil from the resultant sludge, heating the oil to a temperature above 450° F., but below cracking temperature, then contacting the oil with an active adsorptive reagent by causing it to pass upwardly through such reagent and finally passing the oil downwardly through said reagent, then drawing off the purified oil.

3. The method of refining used mineral lubricating oil containing water and hydrocarbon diluents, which consists in removing free water from the oil, heating the oil to approximately 120° F., adding sulphuric acid to the oil while hot, removing the oil from the resultant sludge, heating the oil thereby vaporizing the diluents, contacting the oil while hot with an active adsorptive reagent by passing the oil upwardly through said reagent, allowing the reagent to settle, then passing the oil in the reverse direction through said reagent and finally drawing off the purified oil.

4. The method of refining used mineral lubricating oil containing water and hydrocarbon diluents which consists in removing free water from the oil, heating the oil to approximately 120° F., adding 2% by volume of 66° Bé. commercial sulphuric acid, agitating the mixture while maintaining it at said temperature, removing the oil from the resultant sludge, vaporizing diluents from the oil, adding to the oil while hot 15 to 18% by weight of fuller's earth, by causing the oil to pass upwardly through said fuller's earth, allowing the earth together with the products of reaction to settle into a bed, then drawing the oil downwardly through said bed, and finally drawing off the purified oil.

5. The method of refining used mineral lubricating oil containing water and hydrocarbon diluents which consists in removing free water from the oil, heating the oil to approximately 120° F., adding sulphuric acid to the oil while hot, agitating the mixture, removing the oil from the resultant sludge, vaporizing diluents from the oil, contacting the oil with an active adsorptive reagent by passing the oil upwardly through such reagent whereby the reagent is temporarily suspended in the oil, allowing the reagent to settle into a cake, passing the oil in the reverse direction through said cake, passing the oil through an additional filtering medium to remove final traces of impurities, and finally drawing off the purified oil.

In testimony whereof we affix our signatures.

ROBERT V. AYCOCK.
WILLIAM D. HARRIS.